(12) United States Patent
Khosla

(10) Patent No.: US 12,517,964 B1
(45) Date of Patent: Jan. 6, 2026

(54) SYSTEMS AND METHODS FOR DOMAIN-SPECIFIC RECOMMENDATION MODELS

(71) Applicant: Salesforce, Inc., San Francisco, CA (US)

(72) Inventor: Somya Khosla, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/040,252

(22) Filed: Jan. 29, 2025

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC ............ G06F 16/9535; G06F 16/9536; G06F 16/9538; G06F 16/951; G06F 16/953; G06F 16/9532
See application file for complete search history.

(56) References Cited

U.S. PATENT DOCUMENTS

| 8,190,541 | B2 * | 5/2012 | Downs | G06F 16/3326 706/20 |
| 10,467,215 | B2 * | 11/2019 | Hopcroft | G06F 16/2272 |
| 2019/0065594 | A1 * | 2/2019 | Lytkin | G06F 16/9536 |
| 2022/0138170 | A1 * | 5/2022 | Misiewicz | G06N 3/09 707/737 |
| 2023/0133127 | A1 * | 5/2023 | Balabine | G06F 16/2237 707/739 |
| 2025/0181623 | A1 * | 6/2025 | Jain | G06F 40/30 |

OTHER PUBLICATIONS

Yao, Jing, et al. "Knowledge plugins: Enhancing large language models for domain-specific recommendations." arXiv preprint arXiv: 2311.10779 (2023). (Year: 2023).*

* cited by examiner

*Primary Examiner* — Kris E Mackes
(74) *Attorney, Agent, or Firm* — Haynes and Boone, LLP

(57) ABSTRACT

Embodiments described herein provide A method of item recommendation at an electronic recommendation system, the method comprising: receiving, via a data interface, a query; generating, via a base neural network based recommender model, a first recommendation of at least a first item based on the query, wherein the first item is associated with a vector of tags; computing a scalar value indicative of a relevance level between the first item and a specific domain based on a multiplication of the vector of tags with a learnable coefficient vector associated with the specific domain; and displaying the first item via a user interface in response to the scalar value surpassing a threshold.

20 Claims, 6 Drawing Sheets

SYSTEMS AND METHODS FOR DOMAIN-SPECIFIC RECOMMENDATION MODELS

TECHNICAL FIELD

The embodiments relate generally to machine learning systems for recommendation models, and more specifically to systems and methods for domain-specific recommendation models.

BACKGROUND

AI agents, commonly known as AI agents or virtual assistants, can be applied to a wide range of practical applications across various industries. In customer service, AI agents can handle user inquiries, provide support, and resolve issues 24/7, improving customer satisfaction and reducing operational costs. In healthcare, AI agents can offer initial consultations, answer health-related questions, and remind patients to take their medications. In the e-commerce sector, AI agents can assist with product recommendations, order tracking, and personalized shopping experiences. In information technology (IT) support, these agents can guide users through troubleshooting steps, helping them resolve software and hardware issues. Specifically, for network hazards, AI agents can diagnose connectivity problems, suggest corrective actions, and provide step-by-step guidance to ensure network security and stability. Their versatility and ability to handle diverse tasks make them valuable tools in enhancing efficiency and user experience in various fields.

AI agents often employ a neural network based generative language model to generate an output such as in the form of a text response, or a series actions to complete a complex task, such as to network issue troubleshooting, etc. Such generative language model receives a natural language input in the form of a sequence of tokens, and in turn generates a predicted distribution over a token space conditioned on the input sequence. Generated output tokens over time may in turn form the text response, or actions for completing the task.

A large language model (LLM) may be used for recommendation. For example, recommending items for purchase on an e-commerce website. General LLMs, however have very large numbers of parameters which makes training and inference computationally expensive. For example, an e-commerce website may offer different types of products such as books, clothes, tools, etc. Training an LLM using a large corpus of all product data can be expensive and slow at inference. By limiting recommender models to specific domains, LLM size may be reduced in order to conserve computation resources. However, training of domain-specific models is hindered by training samples outside of the relevant domain.

Figure 1:
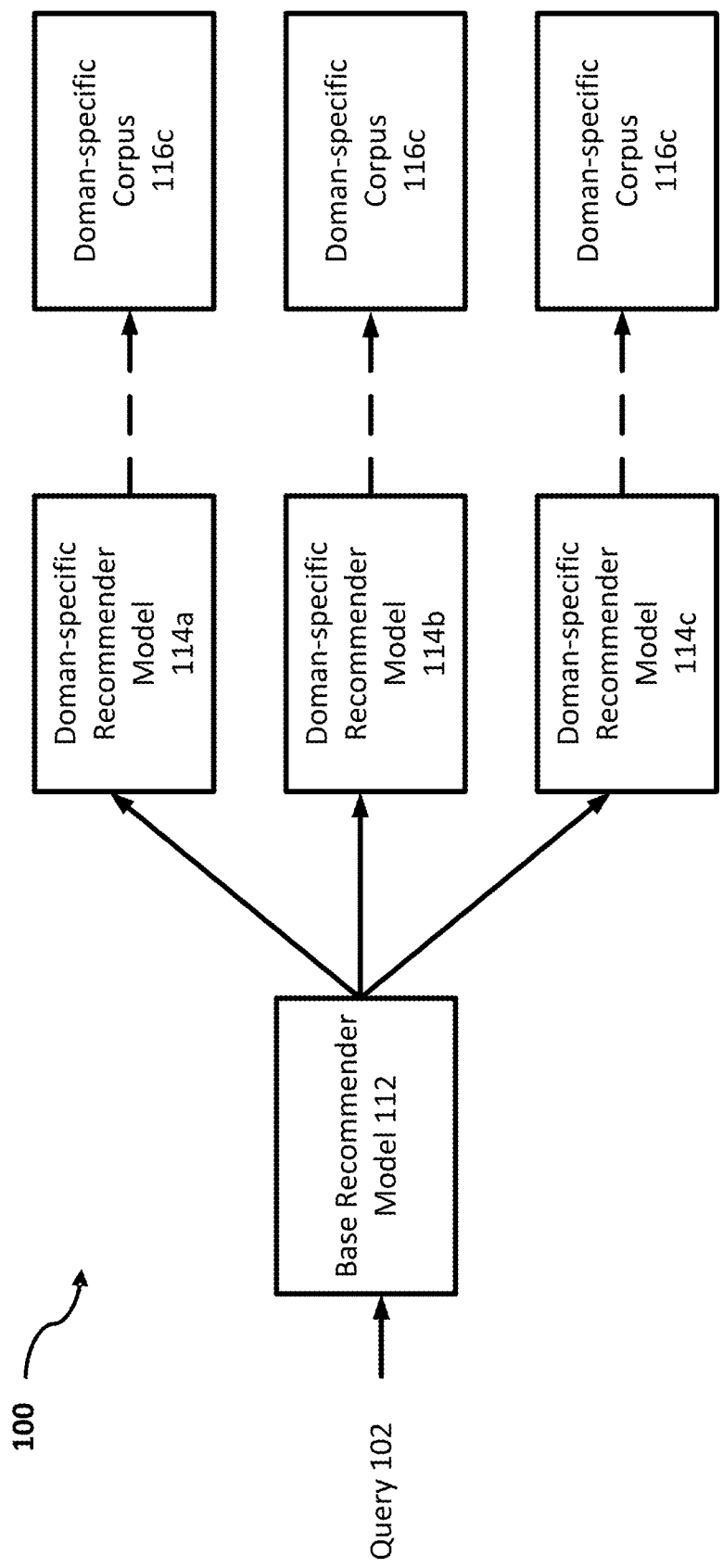
FIG. 1 is a simplified diagram illustrating a recommender model training framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Transformer" may refer to an architecture of a deep learning model designed to process sequential data, such as text, using a mechanism called self-attention. The Transformer architecture handles an entire input sequence of tokens (such as words, letters, symbols, etc.) in parallel, and often generate an output sequence of tokens sequentially. The Transformer architecture may comprise a stack of Transformer layers, each of which contains a self-attention module to weigh the importance of each token relative to other tokens in the sequence and a feed-forward module to further transform the data. Additional details of how a Transformer neural network model processes input data to generate an output is provided in relation to FIG. 2B.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters. An LLM may comprise an architecture of mixed software and/or hardware, e.g., including an application-specific integrated circuit (ASIC) such as a Tensor Processing Unit (TPU).

As used herein, the term "generative artificial intelligence (AI)" may refer to an AI system that outputs new content that does not pr-exist in the input to such AI system. The new content may include text, images, music, or code. An LLM is an example generative AI model that generate tokens representing new words, sentences, paragraphs, passages, and/or the like that do not pre-exist in an input of tokens to such LLM. For example, when an LLM generate a text answer to an input question, the text answer contains words and/or sentences that are literally different from those in the input question, and/or carry different semantic meaning from the input question.

Overview

AI agents often employ a neural network based generative language model to generate an output such as in the form of a text response, or a series actions to complete a complex task, such as to network issue troubleshooting, etc. Such generative language model receives a natural language input in the form of a sequence of tokens, and in turn generates a predicted distribution over a token space conditioned on the input sequence. Generated output tokens over time may in turn form the text response, or actions for completing the task.

A large language model (LLM) may be used for recommendation. For example, recommending items for purchase on an e-commerce website. General LLMs, however have very large numbers of parameters which makes training and inference computationally expensive. For example, an e-commerce website may offer different types of products such as books, clothes, tools, etc. Training an LLM using a large corpus of all product data can be expensive and slow at inference. By limiting recommender models to specific domains, LLM size may be reduced in order to conserve computation resources. However, training of domain-specific models is hindered by training samples outside of the relevant domain.

In view of the need for improved recommender models, embodiments herein provide for a training framework for domain-specific recommender models. In some embodiments, each domain-specific recommender model includes a number of learnable coefficients. An item is identified as belonging to the domain by comparing a weighted sum of tags (features) associated with the item weighted by the coefficients, to a threshold. If the weighted sum is above the threshold, the item is considered part of the domain and may be recommended and/or used in further training the domain-specific recommender model (e.g., but updating the coefficients and/or threshold value). If the weighted sum is below the threshold, the item is discarded and not used as a recommendation for that domain, or in training the domain-specific recommender model.

Embodiments described herein provide a number of benefits. For example, methods described herein provide improved accuracy per domain for the recommender model. By utilizing separate recommender models per domain, the models are able to create good separation between different domains such that each model is able to specialize and provide a more accurate result within its domain. The domain-specific recommender models are much smaller than a full-size base recommender model (e.g., an LLM) and therefore use much fewer memory and computation resources to utilize and train. By only training each specific recommender model on relevant items from the domain, the models will not be adversely affected by out-of-domain training data, thereby providing more accurate recommendations within the domain. Therefore, with improved performance on recommender models, neural network technology in item recommendation is improved.

FIG. 1 is a simplified diagram illustrating a recommender model training framework 100 according to some embodiments. A base recommender model 112 is provided that is trained to generate item recommendations based on an input prompt. In some embodiments, base recommender model 112 also provides tags associated with a recommended item. For example, tags may be features of an item such as brand, material, certain categorizations such as home goods, lifestyle, etc. The tags may be represented in a vector form, with each value in the vector representing a corresponding tag. In some embodiments, the value of each tag for an item may be either a 0 or a 1 representing whether or not the tag accurately reflects a property of the item. For example, a "batter-powered" tag may be a 0 for an article of clothing, but a 1 for a mobile phone.

Base recommender model 112 may also provide a score to a recommended item indicating the strength of the recommendation, or a probability associated with the recommendation. The score may be used, for example, in ranking and determining which items to provide to a user when there are multiple recommended items. The base recommender model 112 may have access to a full corpus of items. For example, base recommender model 112 may be trained with the full corpus such that information regarding all the items is contained implicitly in the model. In some embodiments, recommender model 112 has access to a database of items that may be retrieved or have portions retrieved in response to a query and provided as part of the context to base recommender model 112. In some embodiments, the database also includes the tags associated with the items.

Base recommender model 112 may be a transformer-based LLM. As it is an LLM, a recommendation may be generated simply by providing a prompt to the recommender model 112 asking for a recommendation. The training of base recommender model 112 may be performed using training data over an entire corpus of items (e.g., every item in an online catalog). Training data 102 may be provided including items from a catalog, and information associated with the items, referred to herein as "tags." Tags may include, for example, item characteristics such as brand, price, material, etc. In some embodiments, the training data may include domain classification labels for some or all of the items.

Domain specific recommender models 114 are smaller (i.e., fewer parameter) models that are utilized for recommending items of a particular domain. For example, a domain-specific recommender model 114a may recommend items from a "clothing" domain, domain-specific recommender model 114b may recommend items from a "tools" domain, and domain-specific recommender model 114c may recommend items from an "electrical equipment" domain. Domains may or may not have significant semantic overlap. For example, tools and clothing are unlikely to have significant overlap of items belonging to those domains, however tools and electrical equipment may have more items that could belong to each of those domains.

Domain-specific recommender models 114 may determine if an item (e.g., from base recommender model 112) is associated with a domain based on the tags. For example, domain-specific recommender models 114a-114c may utilize a regression model of the form:

$R_1$: $a_1 t_{11} + a_2 t_{12} + \ldots + a_n t_{1n}$; Threshold $Th_1 \in [0,1]$
$R_2$: $b_1 t_{21} + b_2 t_{22} + \ldots + b_n t_{2n}$; Threshold $Th_2 \in [0,1]$
$R_3$: $c_1 t_{31} + c_2 t_{32} + \ldots + c_n t_{3n}$; Threshold $Th_3 \in [0,1]$ $R_1$ represents a first domain (and thereby an associated domain-specific recommender model e.g., model 114a). Variables a, b, and c represent learnable coefficients, each letter being associated with a different domain, and each subscript identifying the related tag. Variables t represent the item tags. Each domain-specific recommender model 114 may use different tags for determining whether an item is in-domain, and accordingly the first subscript of the t variables represents the corresponding domain (as the specific tags used vary based on the domain), and the second subscript represents the specific tag used for that domain. As shown in the above equations, each learnable coefficient is multiplied by the corresponding tag, and the sum of those results is a value that is compared to a threshold, which may also be domain-specific as represented by $Th_n$ where n represents the domain.

For example, for domain $R_1$, tags $t_{1j}$ of a certain item (e.g., from the base recommender model 112) are multiplied by corresponding coefficients $a_j$ and those products are summed. If the sum exceeds the threshold $Th_1$, then then that item is considered in-domain for that domain. In response to being in-domain, domain-specific recommender model may include the item in a domain-specific corpus 116. Domain-specific corpuses 116 may be drawn from for generating recommendations for items in that domain. Items in the domain-specific corpus 116 may also be used to learn the coefficients of the associated domain-specific recommender model 114.

For example, if a user requests recommendations for items from a domain (or a website otherwise is configured to display items of a certain category/domain), items may be recommended from a domain-specific corpus 116. If there are insufficient items in the domain-specific corpus, then base recommender model 112 may be prompted to provide a recommendation for items from that domain. In response, base recommender model 112 may generate a response providing one or more items, associated tags, and/or a score. The domain-specific recommender model may determine, based on the tags provided by base recommender model 112, if the provided item is within the domain by comparing the weighted sum to the threshold as described above. If the recommended item is out of domain, then the recommendation is discarded. If the item is determined to be in-domain, it may be displayed to the requesting user, added to domain-specific corpus 116, and/or used in updating the coefficients of the domain-specific recommender model.

In some embodiments, coefficients for a domain-specific recommender model are learned on a subset of data. This subset can be created using multiple techniques. In some embodiments, as in the example above, items are selected/filtered that have the corresponding tags (features/variables) such that the model currently categorizes it as in-domain, and use that dataset for fitting the model. In some embodiments, a training corpus may include items that are known or otherwise labeled as belonging to a certain domain, and the training may be performed on those items whether or not the model currently categorizes them as in-domain. The training may be performed such that the coefficients associated with the tags most often associated with items in the domain have higher values than coefficients associated with the tags least often associated with items in the domain. In some embodiments, the tags used by a domain-specific recommender model may be a subset of a full vocabulary of tags. In some embodiments, training the domain-specific recommender model includes changing which tags are included in the analysis. For example, a domain-specific recommender model may have tags A, B, and C which are used for classifying items as in-domain, with corresponding weighting coefficients for each tag. If a number of items are classified as in-domain using those tags are identified as commonly having a fourth tag D that is indicative of the item being in-domain, that tag may be added to or replace the other tags. For example, the tags used for classification may be changed to A, B, and D if D is determined to be more indicative of an in-domain item that C.

In some embodiments, the training is performed in multiple stages. For example, an initial labeled training corpus may be used to have a first approximation of coefficients, and after that recommended items that are considered in-domain may be used for fine-tuning the coefficients. In some embodiments, a training stage may include determining domains based on an unlabeled grouping of items in a corpus. For example, items may be grouped based on similarity of tags, and clusters may be associated with different domains, without reference to a predetermined label.

Once the coefficients have been learned, the domain-specific recommender model 114 is ready for consumption on the given catalog. Suppose additional items are added to the catalog (e.g., 1000 new items) that will carry new tags with them. In such a case new tags (e.g., another 100) may be added to domain-specific recommender model 114. For example, if previously a domain-specific recommender model 114 used 200 variables, it may have 300 after adding the additional new items, and the domain-specific recommender model 114 is re-trained on the new subset of data to learn coefficients. During this retraining, the previous weights will get readjusted, to make room for the new weights (so that the sum of weights shall remain 1 or ~1). In some embodiments, a retraining is performed only when adding a new vertical in products. If adding new but similar items, there are usually multiple tags (features/variables to identify it) attached to each item which allows the domain-specific recommender model 114 to recommend those items based on existing variables in the model.

In some embodiments, the threshold may be adjusted on a per-domain basis. In some embodiments, domains with items that overlap with other domains may be configured to have higher thresholds than those with less or no overlap with other domains. In some embodiments, the thresholds are automatically determined. For example, threshold values may be learned to meet a target number of domains selected for each item (e.g., 1 domain).

In some embodiments, an item may be in-domain for multiple domains, and may therefore be used in training of multiple models or otherwise recommended to a user associated with different domains. In some embodiments, rather than a threshold determination, the domain with the highest value of the weighted sum (of tag/coefficient products) is selected as the domain to use the specific item from the training data.

Computer and Network Environment

Figure 2A:
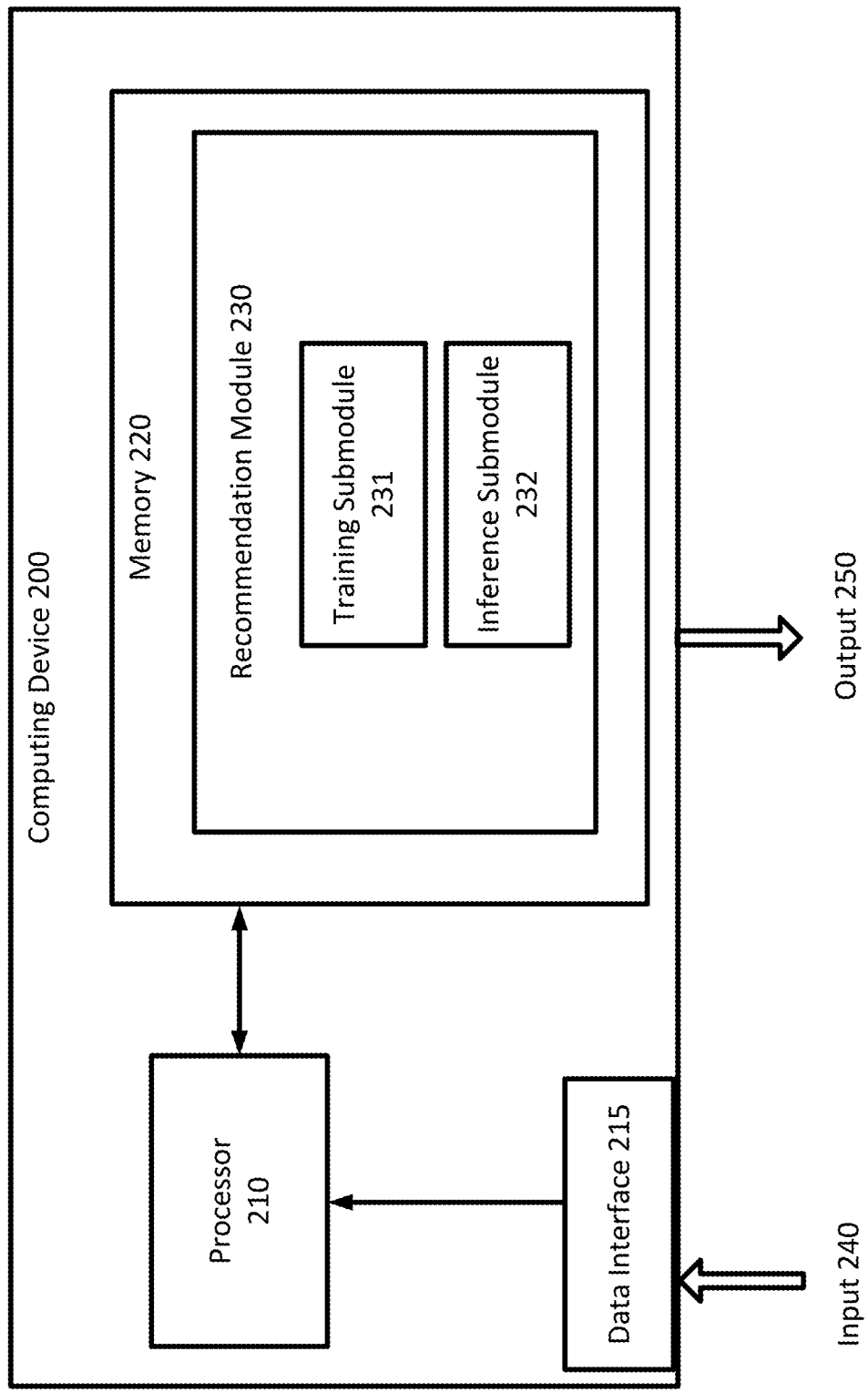
FIG. 2A is a simplified diagram illustrating a computing device implementing the recommender model training framework described in FIG. 1, according to some embodiments.

FIG. 2A is a simplified diagram illustrating a computing device 200 implementing the recommender model training framework described in FIG. 1, according to some embodiments. As shown in FIG. 2A, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

Figure 2B:
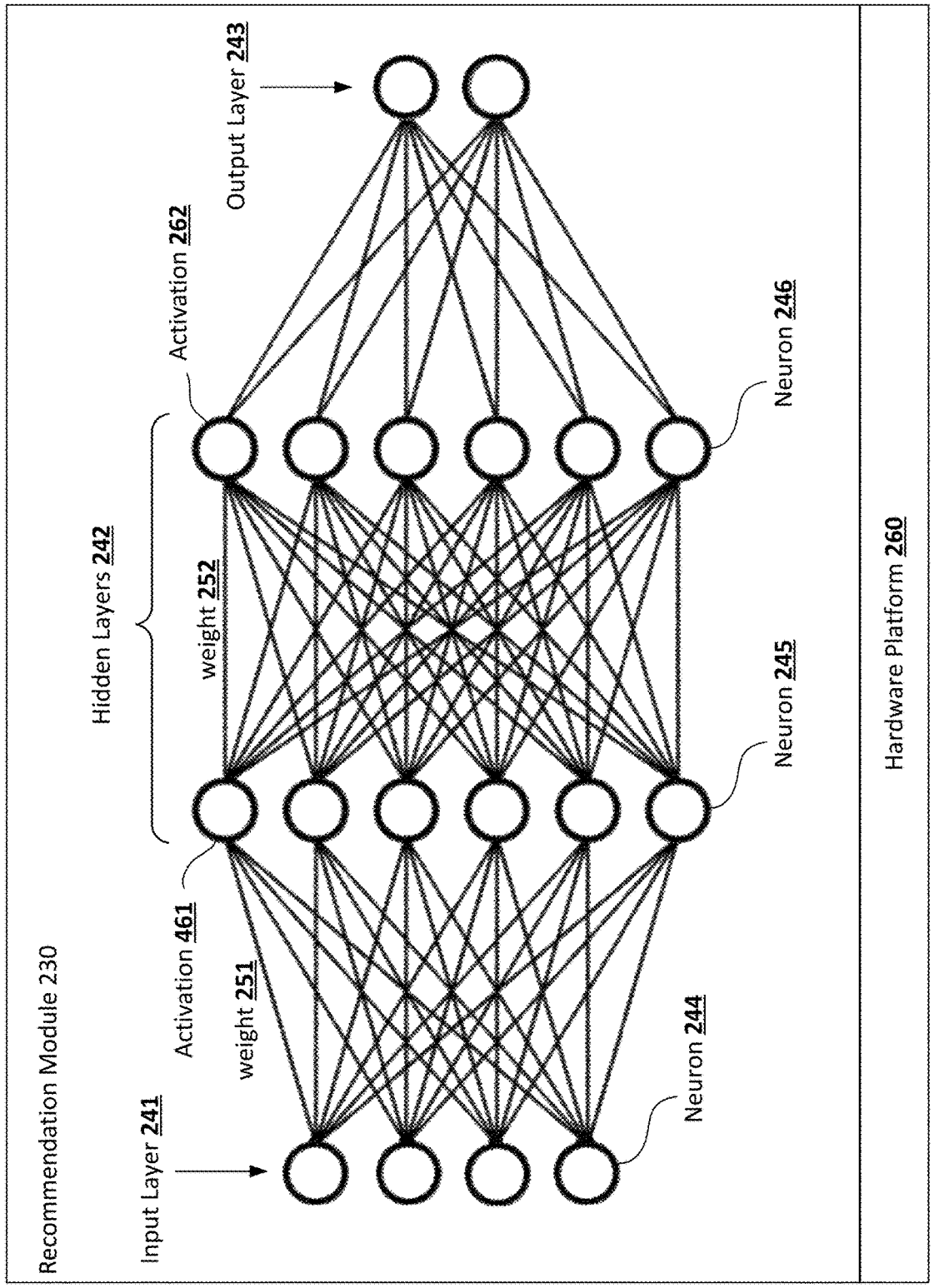
FIG. 2B is a simplified diagram illustrating a neural network structure, according to some embodiments.

In another embodiment, processor 210 may comprise multiple microprocessors and/or memory 220 may comprise multiple registers and/or other memory elements such that processor 210 and/or memory 220 may be arranged in the form of a hardware-based neural network, as further described in FIG. 2B.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for recommendation module 230 that may be used to implement and/or emulate the systems and models, and/or to implement any of the methods described further herein. recommendation module 230 may receive input 240 such as an input training data (e.g., items, tags, etc.) via the data interface 215 and generate an output 250.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as an item recommendation, from a user via the user interface.

In some embodiments, the recommendation module 230 is configured to train domain-specific recommender models and thereby provide item recommendations. The recommendation module 230 may further include training submodule 231 configured to perform training (e.g., updating coefficients of domain-specific recommender models) as described herein. The recommendation module 230 may further include inference submodule 232 configured to provide recommendations using domain-specific recommender models and/or the base recommender model as described herein.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 2B is a simplified diagram illustrating the neural network structure implementing the recommendation module 230 described in FIG. 2A, according to some embodiments. In some embodiments, the recommendation module 230 and/or one or more of its submodules 231-232 may be implemented at least partially via an artificial neural network structure shown in FIG. 2B. The neural network comprises a computing system that is built on a collection of connected units or nodes, referred to as neurons (e.g., 244, 245, 246). Neurons are often connected by edges, and an adjustable weight (e.g., 251, 252) is often associated with the edge. The neurons are often aggregated into layers such that different layers may perform different transformations on the respective input and output transformed input data onto the next layer.

For example, the neural network architecture may comprise an input layer 241, one or more hidden layers 242 and an output layer 243. Each layer may comprise a plurality of neurons, and neurons between layers are interconnected according to a specific topology of the neural network topology. The input layer 241 receives the input data (e.g., 240 in FIG. 2A), such as a query. The number of nodes (neurons) in the input layer 241 may be determined by the dimensionality of the input data (e.g., the length of a vector of the query). Each node in the input layer represents a feature or attribute of the input.

The hidden layers 242 are intermediate layers between the input and output layers of a neural network. It is noted that two hidden layers 242 are shown in FIG. 2B for illustrative purpose only, and any number of hidden layers may be utilized in a neural network structure. Hidden layers 242 may extract and transform the input data through a series of weighted computations and activation functions.

For example, as discussed in FIG. 2A, the recommendation module 230 receives an input 240 of a query and transforms the input into an output 250 of a product, related tags, and/or a related score. To perform the transformation, each neuron receives input signals, performs a weighted sum of the inputs according to weights assigned to each connection (e.g., 251, 252), and then applies an activation function (e.g., 261, 262, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 241 is transformed into rather different values indicative data characteristics corresponding to a task that the neural network structure has been designed to perform.

The output layer 243 is the final layer of the neural network structure. It produces the network's output or prediction based on the computations performed in the preceding layers (e.g., 241, 242). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the recommendation module 230 and/or one or more of its submodules 231-232 may comprise the transformative neural network structure of layers of neurons, and weights and activation functions describing the non-linear transformation at each neuron. Such a neural network strucsors 210, such as a graphics processing unit (GPU). An example neural network may be a transformer-based LLM, and/or the like.

In one embodiment, the recommendation module 230 and its submodules 231-232 may comprise one or more LLMs built upon a Transformer architecture (e.g., for the base recommender model 112). For example, the Transformer architecture comprises multiple layers, each consisting of self-attention and feedforward neural networks. The self-attention layer transforms a set of input tokens (such as words) into different weights assigned to each token, capturing dependencies and relationships among tokens. The feedforward layers then transform the input tokens, based on the attention weights, represents a high-dimensional embedding of the tokens, capturing various linguistic features and relationships among the tokens. The self-attention and feedforward operations are iteratively performed through multiple layers of self-attention and feedforward layers, thereby generating an output based on the context of the input tokens. One forward pass for an input tokens to be processed through the multiple layers to generate an output in a Transformer architecture often entail hundreds of teraflops (trillions of floating-point operations) of computation.

For example, the Transformer-based architecture may process an input sequence of tokens (e.g., letters, symbols, numbers, signs, words, etc.) using its encoder-decoder architecture (for tasks such as machine translation, etc.) or just the encoder (for classification tasks) or decoder (for generation-only tasks). First, the input sequence may be tokenized and converted into embeddings, which are dense numerical representations, e.g., vectors of values. Positional encodings are added to these embeddings to provide information about the order of tokens.

The Transformer encoder, usually consisting of multiple layers, each of which may processes the input using a multi-head self-attention mechanism to capture relationships between tokens and a feed-forward network to transform the information, resulting in encoded representations of the input sequence of tokens.

For example, the multi-head self-attention mechanism at each Transformer layer within the Transformer encoder of an LLM may project input embeddings at the layer into three different embedding spaces using weight matrices, referred to as Query (Q) representing what a token wants to attend to, Key (K) representing what this token offers as information and Value (V) representing the actual information carried by the token. The Q K, V matrices contain tunable weights of a Transformer-based language model that are updated during training. Then, the attention mechanism computes attention scores between all tokens in the input sequence using the Q, K and V matrices. The resulting attention scores are then used to generate encoded representations of the input sequence of tokens.

Similarly, the Transformer decoder may comprise a symmetric structure with the encoder, consisting of multiple layers, each of which may comprise a multi-head self-attention mechanism. The decoder may start with a special start token and use the multi-head self-attention mechanism, augmented with encoder-decoder attention to focus on relevant parts of the decoder input. The decoder may generate output tokens one by one, with each step using the previously generated tokens as part of the input and updated attention weights. Finally, the decoder may comprise a linear layer and softmax function predict probabilities for the next token in the sequence, selecting the most likely one to continue the output. This process repeats until a special end token is generated or a length limit is reached.

The generated sequence of tokens may jointly represent an output. For example, a Transformer-based LLM (such as LLM 110a-d) may receive a natural language input (such as a question) and generate a natural language output (such as an answer to the question).

In one embodiment, the recommendation module 230 and its submodules 231-232 may be implemented by hardware, software and/or a combination thereof. For example, the recommendation module 230 and its submodules 231-232 may comprise a specific neural network structure implemented and run on various hardware platforms 260, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 260 used to implement the neural network structure is specifically configured based on factors such as the complexity of the neural network, the scale of the tasks (e.g., training time, input data scale, size of training dataset, etc.), and the desired performance.

For example, to deploy the recommendation module 230 and its submodules 231-232 and/or any other neural network models such as the base recommender model 112 and/or the domain-specific recommender models 114 described in FIG. 1 onto hardware platform 260, the neural network based modules 230 and its submodules 231-232 may be optimized for deployment by converting it to a suitable format, such as ONNX or TensorRT, to improve performance and compatibility. Next, depending on the size and workload requirements for modules 230 and its submodules 231-232, hardware types may be chosen for deployment, e.g., processing capacity, GPU memory size, and/or the like. Frameworks and drivers for the chosen hardware 260 frameworks and drivers may thus be installed, such as PyTorch, TensorFlow, or CUDA, to support the hardware platform 260. Then, weights and parameters of the recommendation module 230 and its submodules 231-232 may be loaded to the hardware 260. For large-scale deployments (e.g., with billions of weights for example), distributed computing frameworks may be used to handle model partitioning across multiple devices, e.g., hardware processors such as GPUs may be distributed on multiple devices, each handling a portion of weights of the model and therefore would undertake a portion of computational workload. In some embodiments, the recommendation module 230 and its submodules 231-232 may be deployed as a service, then they may be integrated with an API endpoint, using tools like Flask, FastAPI, or a cloud platform serverless services, and is accessible by a remote user via a network.

In another embodiment, some or all of layers 241, 242, 243 and/or neurons 242, 245, 246, and operations there between such as activations 261, 262, and/or the like, of the recommendation module 230 and its submodules 231-232 may be realized via one or more ASICs. For example, each neuron 242, 245 and 246 may be a hardware ASIC comprising a register, a microprocessor, and/or an input/output interface. For another example, operations among the neurons and layers may be implemented through an ASIC TPU. For yet another example, some operations among the neurons and layers such as a softmax operation, an activation function (such as a rectified linear unit (ReLU), sigmoid linear unit (SiLU), and/or the like) may be implemented by one or more ASICs.

For example, the recommendation module 230 may generate, by at least one ASIC (such as a TPU, etc.) performing a multiplicative and/or accumulative operation for a neural network language model, a next token based at least in prat on previously generated tokens, and in turn generate a natural language output representing the next-step action combining a sequence of generated tokens.

In one embodiment, the neural network based recommendation module 230 and one or more of its submodules 231-232 may be trained by iteratively updating the underlying parameters (e.g., weights 251, 252, etc., bias parameters and/or coefficients in the activation functions 261, 262 associated with neurons) of the neural network based on a loss function. For example, during forward propagation, the training data such as products and their tags are fed into the neural network. The data flows through the network's layers 241, 242, with each layer performing computations based on its weights, biases, and activation functions until the output layer 243 produces the network's output 250. In some embodiments, output layer 243 produces an intermediate output on which the network's output 250 is based.

The output generated by the output layer 243 is compared to the expected output (e.g., a "ground-truth" such as the corresponding domain) from the training data, to compute a loss function that measures the discrepancy between the predicted output and the expected output. Given the loss, the negative gradient of the loss function is computed with respect to each weight of each layer individually. Such negative gradient is computed one layer at a time, iteratively backward from the last layer 243 to the input layer 241 of the neural network. These gradients quantify the sensitivity of the network's output to changes in the parameters. The chain rule of calculus is applied to efficiently calculate these gradients by propagating the gradients backward from the output layer 243 to the input layer 241.

In one embodiment, the neural network based recommendation module 230 and one or more of its submodules 231-232 may be trained using policy gradient methods, also referred to as "reinforcement learning" methods. For example, instead of computing a loss based on a training output generated via a forward propagation of training data, the "policy" of the neural network model, which is a mapping from an input of the current states or observations of an environment the neural network model is operated at, to an output of action. Specifically, at each time step, a reward is allocated to an output of action generated by the neural network model. The gradients of the expected cumulative reward with respect to the neural network parameters are estimated based on the output of action, the current states of observations of the environment, and/or the like. These gradients guide the update of the policy parameters using gradient descent methods like stochastic gradient descent (SGD) or Adam. In this way, as the "policy" parameters of the neural network model may be iteratively updated while generating an output action as time progresses, the boundaries between training and inference are often less distinct compared to supervised learning—in other words, backward propagation and forward propagation may occur for both "training" and "inference" stages of the neural network mode.

In some embodiments, recommendation module 230 and its submodules 231-232 may be housed at a centralized server (e.g., computing device 200) or one or more distributed servers. For example, one or more of recommendation module 230 and its submodules 231-232 may be housed at external server(s). The different modules may be communicatively coupled by building one or more connections through application programming interfaces (APIs) for each respective module. Additional network environment for the distributed servers hosting different modules and/or submodules may be discussed in FIG. 3.

During a backward pass, parameters of the neural network are updated backwardly from the last layer to the input layer (backpropagating) based on the computed negative gradient using an optimization algorithm to minimize the loss. The backpropagation from the last layer 243 to the input layer 241 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as item recommendation.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

In some implementations, to improve the computational efficiency of training a neural network model, "training" a neural network model such as an LLM may sometimes be carried out by updating the input prompt, e.g., the instruction to teach an LLM how to perform a certain task. For example, while the parameters of the LLM may be frozen, a set of tunable prompt parameters and/or embeddings that are usually appended to an input to the LLM may be updated based on a training loss during a backward pass. For another example, instead of tuning any parameter during a backward pass, input prompts, instructions, or input formats may be updated to influence their output or behavior. Such prompt designs may range from simple keyword prompts to more sophisticated templates or examples tailored to specific tasks or domains.

In general, the training and/or finetuning of an LLM can be computationally extensive. For example, GPT-3 has 175 billion parameters, and a single forward pass using an input of a short sequence can involve hundreds of teraflops (trillions of floating-point operations) of computation. Training such a model requires immense computational resources, including powerful GPUs or TPUs and significant memory capacity. Additionally, during training, multiple forward and backward passes through the network are performed for each batch of data (e.g., thousands of training samples), further adding to the computational load.

In general, the training process transforms the neural network into an "updated" trained neural network with updated parameters such as weights, activation functions, and biases. The trained neural network thus improves neural network technology in item recommendation.

Figure 3:
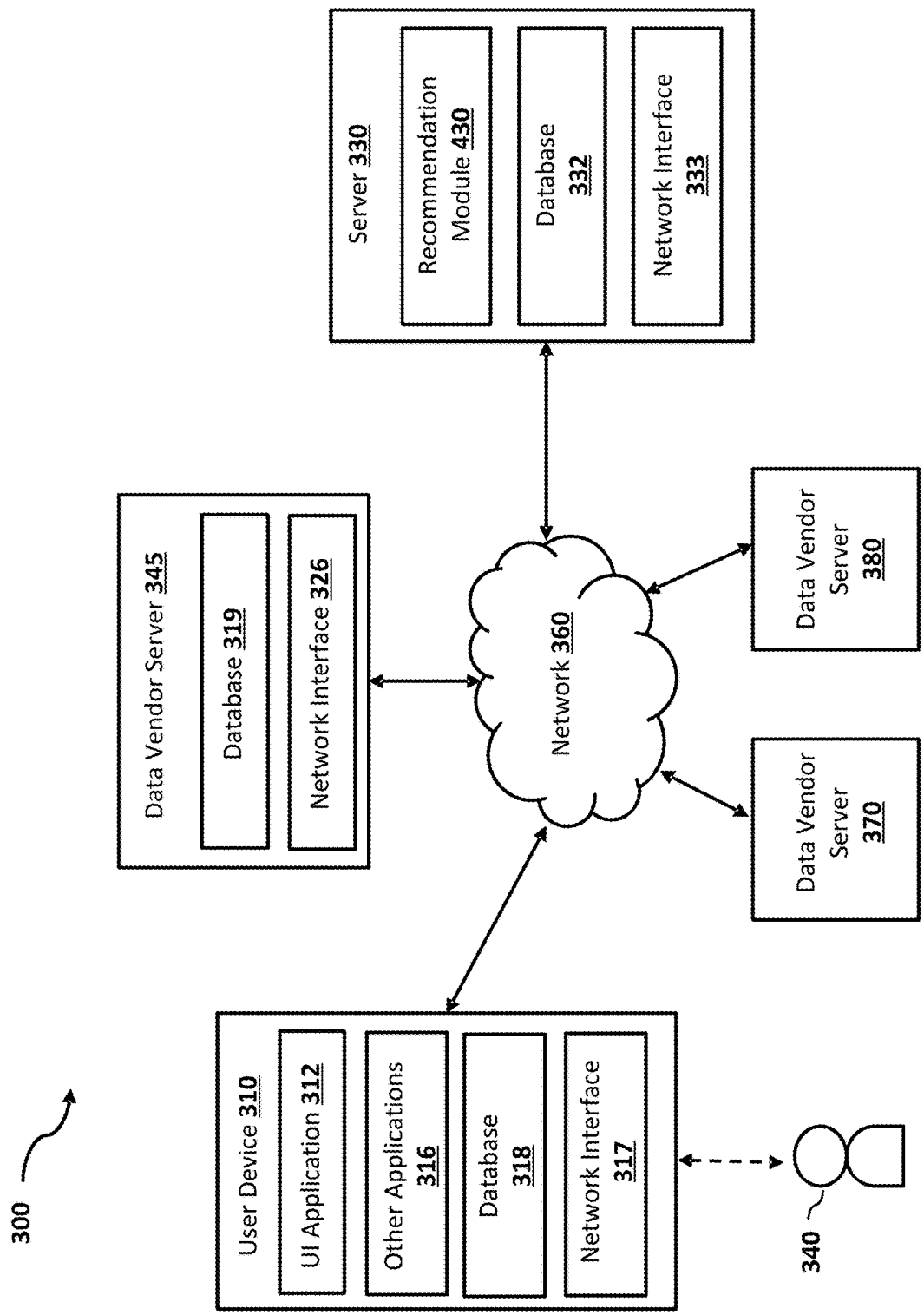
FIG. 3 is a simplified block diagram of a networked system suitable for implementing the recommender model training framework described in FIGS. 1-2B and other embodiments described herein.

FIG. 3 is a simplified block diagram of a networked system 300 suitable for implementing the recommender model training framework described in FIGS. 1-2B and other embodiments described herein. In one embodiment, system 300 includes the user device 310 which may be operated by user 340, data vendor servers 345, 370 and 380, server 330, and other forms of devices, servers, and/or software components that operate to perform various methodologies in accordance with the described embodiments. Exemplary devices and servers may include device, standalone, and enterprise-class servers which may be similar to the computing device 200 described in FIG. 2A, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating a recommendation from the server 330 and display the message via the UI application 312. In other embodiments, user device 310 may include additional or different modules having specialized hardware and/or software as required.

In one embodiment, UI application 312 may communicatively and interactively generate a UI for an AI agent implemented through the recommendation module 230 (e.g., an LLM agent) at server 330. In at least one embodiment, a user operating user device 310 may enter a user utterance, e.g., via text or audio input, such as a question, uploading a document, and/or the like via the UI application 312. Such user utterance may be sent to server 330, at which recommendation module 230 may generate a response via the process described in FIG. 1. The recommendation module 230 may thus cause a display of item recommendations at UI application 312 and interactively update the display in real time with the user utterance.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view recommendations.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including queries, products, tags, known domains, etc. to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the recommendation module 230 and its submodules described in FIG. 2A. In some implementations, recommendation module 230 may receive data from database 319 at the data vendor server 345 via the network 360 to generate recommendations. The generated recommendations may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the recommendation module 230. In one implementation, the database 332 may store previously generated recommendations, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Work Flows

Figure 4:
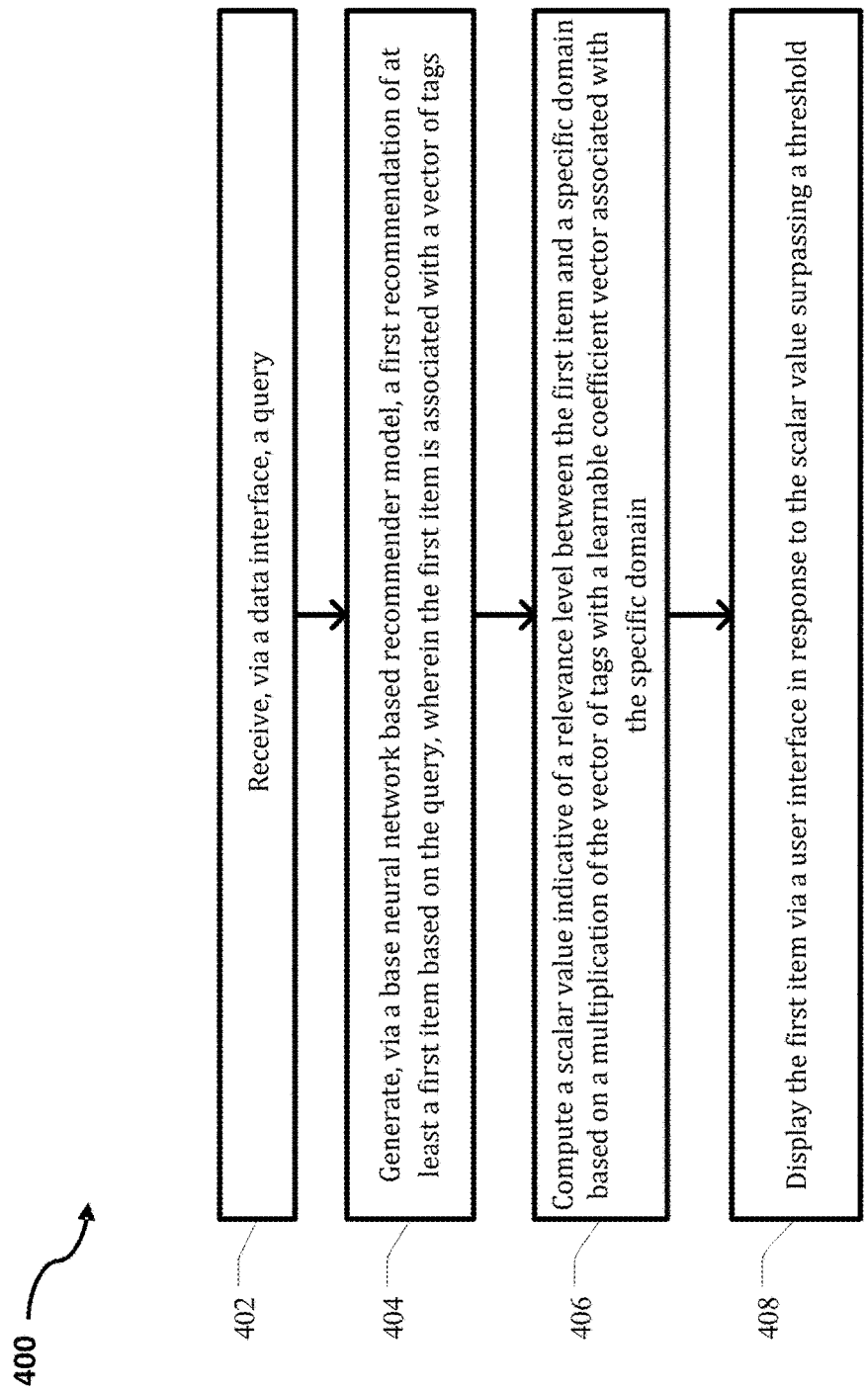
FIG. 4 is an example logic flow diagram illustrating a method of item recommendation based on the framework shown in FIGS. 1-3, according to some embodiments.

FIG. 4 is an example logic flow diagram 400 illustrating a method of item recommendation based on the framework shown in FIGS. 1-3, according to some embodiments. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of the recommendation module 230 (e.g., FIGS. 2A and 3) that performs training and inference of domain-specific and/or base recommendation models.

In some embodiments, method 400 is performed by a system such as computing device 200, user device 310, server 330, or another device or combination of devices. Inputs (e.g., a query) may be received via a data interface such as data interface 215, network interface 317, network interface 333, or via a data interface that is integrated with a device. For example UI Application 312 may receive user inputs via a text input interface (e.g., keyboard), audio input (e.g., microphone), video interface (e.g., camera), or other interface for receiving user inputs (e.g., a mouse or touch display).

As illustrated, the method 400 includes a number of enumerated steps, but aspects of the method 400 may include additional steps before, after, and in between the enumerated steps. In some aspects, one or more of the enumerated steps may be omitted or performed in a different order.

At step 402, a system receives, via a data interface, a query.

At step 404, the system generates, via a base neural network based recommender model, a first recommendation of at least a first item based on the query, wherein the first item is associated with a vector of tags.

At step 406, the system computes a scalar value indicative of a relevance level between the first item and a specific domain based on a multiplication of the vector of tags with a learnable coefficient vector associated with the specific domain.

At step 408, the system displays the first item via a user interface in response to the scalar value surpassing a threshold. The first recommendation may further include a second item based on the query associated with a second vector of tags. In some embodiments, the system computes a second scalar value indicative of a relevance level between the second item and the specific domain based on a multiplication of the second vector of tags with the learnable coefficient vector associated with the specific domain. The system may reject the second item in response to the scalar value failing to surpass the threshold. Rejecting the second item may include not including the second item in the domain-specific corpus, not using the second item for updating values of the learnable coefficient vector and/or not displaying the second item via the user interface.

In some embodiments, the system updates values of the learnable coefficient vector based on the first item in response to the scalar value surpassing the threshold. In some embodiments, updating includes increasing values of the learnable coefficient vector associated with tags in the vector of tags associated with the first item.

In some embodiments, the system updates values of the learnable coefficient vector based on a training dataset including a plurality of items. Updating values of the learnable coefficient vector based on a training dataset may be performed based on a plurality of labels associated with the plurality of items. Updating values of the learnable coefficient vector based on a training dataset may be performed via grouping of the items without reference to labels.

In some embodiments, method 400 is applicable in a variety of applications. For example, the task request received by the system may relate to a diagnostic request in view of a medical record in a healthcare system, a curriculum designing request in an online education system, a code generation request in a software development system, a writing and/or editing request in a content generation system, an IT diagnostic request in an IT customer service support system, a navigation request in a robotic and autonomous system, and/or the like. By performing method 400, the neural network based artificial agent may improve technology in the respective technical field in healthcare and diagnostics, education and personalized learning, software development and code assistance, content creation, autonomous system (such as autonomous driving, etc.), and/or the like.

For example, when the task query includes a query to identify an information technology (IT) anomaly relating to a usage of an IT component such as a network gateway, a router, an online printer, and/or the like, by performing method 400 at an environment of a local area network (LAN), the neural network based artificial agent may receive an observation from the environment at which the next-step action is executed, and determine that the observation representing an information technology anomaly (e.g., a router failure, an unauthorized access attempt, a domain name system anomaly, and/or the like). Recommended items may be identification of specific problems, specific solutions, etc. which may be categorized in different domains such as network problems, router problems, etc. In some implementations, the neural network based artificial agent may cause an alert relating to the information technology anomaly to be displayed at a visualized user interface. In this way, IT anomalies may be detected and alerted using the neural network based artificial agent in an efficient manner so as to improve network support technology.

Figure 5:
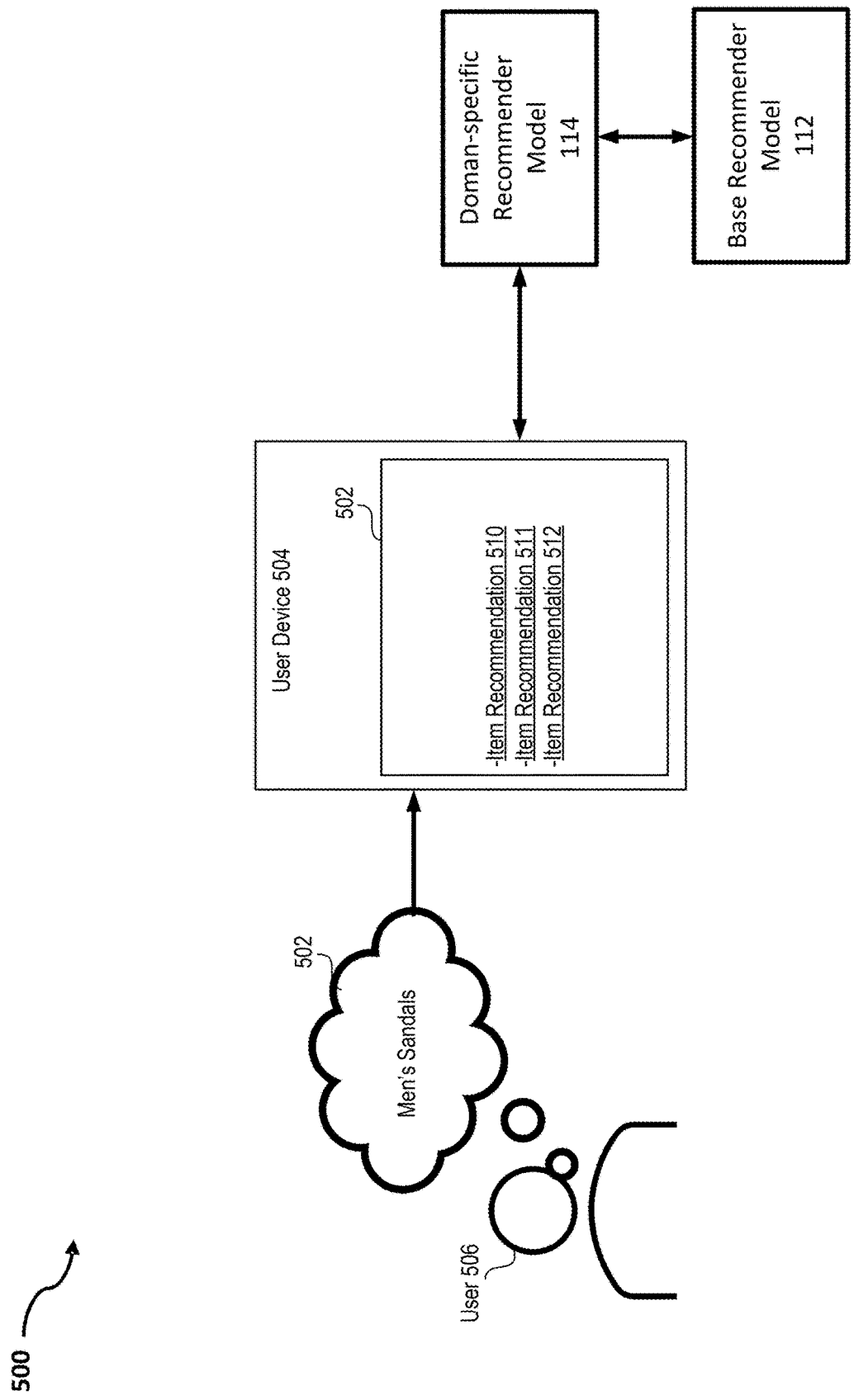
FIG. 5 illustrates a system for providing item recommendations vis a user device, according to some embodiments.

FIG. 5 illustrates a system 500 for providing item recommendations vis a user device, according to some embodiments. A user 506 may utter a query 502 in natural language. In response, a user device 504 may output/display an answer 502 on a display interface, such as a screen. In some embodiments, answer 502 is the output of an artificial intelligence (AI) agent, which is built on a bot server that is communicatively connected to user device 504. The AI agent may be based on, or include, an LLM. In some embodiments, the LLM receives query through utterance of user 502, which may retrieve a corpus of documents, and generate an output based on the retrieved documents.

As an example, query 502 may include a question of "Men's sandals" The AI agent may determine based on a domain-specific corpus some recommended items associated with the domain of men's sandals. In some embodiments, the domain-specific corpus is identified based on a semantic similarity between the query and an identification of the domain. For example, a query of "Men's sandals" may be associated with a domain of "Sandals, Men" due to semantic similarity. The system may automatically determine the relevant domain (and therefore associated corpus and recommender model) based on the query. If insufficient relevant items are in the corpus as identified by a domain-specific recommender model 114, then a request may be sent to base recommender model 112. Base recommender model 112 may generate a recommendation with associated tags and/or a score. If domain-specific recommender model 114 determines that the item recommended by base recommender model 112 is in-domain based on the tags (e.g., the tags when summed as weighted by the coefficients of model 114 exceed the predetermined threshold), then the recommendation is accepted and provide to the user in answer 502. Otherwise, if the item is out-of-domain, then it may be rejected and not displayed to a user. Accepted item recommendation may include item recommendations 510, 511, and 512 as illustrated. The underlying models 112 and 114 may be implemented at user device 504, or at a remote server which is accessible by the user device 504.

In some embodiments, when the user device 504 is provided a query 502, the base recommender model 112 may generate a recommended item. For example, the query may be associated with an e-commerce website with multiple categories of items, and the query may prompt the base recommender model 112 to provide items within a certain category (e.g., men's clothing). The system may determine the tags associated with recommended items (e.g., based on a catalog database), and input those tags to the trained domain-specific recommender model 114. Items which do not generate a value that exceeds the threshold for the specific domain may be rejected and not presented to a user. Items which do generate values that exceed the threshold may be accepted and presented to a user. For example, an e-commerce website may have a portion of the website that recommends items by category, and may be promoting men's clothing. The base recommender model 112 may be prompted for men's clothing and respond with 10 recommended items. The 10 items may be classified via domain-specific recommender model 114, and only those items that successfully classify for the "clothing" domain are accepted.

In some embodiments, an additional filtering or ranking may be performed on recommended items. For example, a domain-specific recommender model may provide 20 recommended items, but the user may presented only 10 of the items based on the 10 with descriptions that most closely match the semantics of the query. In some embodiments, this ranking may be based on the score.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of item recommendation at an electronic recommendation system, the method comprising:
   receiving, via a data interface, a query;
   generating, via a base neural network based recommender model, a first recommendation of at least a first item based on the query, wherein the first item is associated with a vector of tags;
   computing a scalar value indicative of a relevance level between the first item and a specific domain based on a multiplication of the vector of tags with a learnable coefficient vector associated with the specific domain; and displaying the first item via a user interface in response to the scalar value surpassing a threshold.

2. The method of claim 1, further comprising:
updating values of the learnable coefficient vector based on the first item in response to the scalar value surpassing the threshold.

3. The method of claim 2, wherein the updating includes increasing values of the learnable coefficient vector associated with tags in the vector of tags associated with the first item.

4. The method of claim 1, wherein the first recommendation further includes a second item based on the query associated with a second vector of tags, further comprising:
computing a second scalar value indicative of a relevance level between the second item and the specific domain based on a multiplication of the second vector of tags with the learnable coefficient vector associated with the specific domain; and
rejecting the second item in response to the scalar value failing to surpass the threshold.

5. The method of claim 1, further comprising:
updating values of the learnable coefficient vector based on a training dataset including a plurality of items.

6. The method of claim 5, wherein the updating values of the learnable coefficient vector based on a training dataset is performed based on a plurality of labels associated with the plurality of items.

7. The method of claim 5, wherein the updating values of the learnable coefficient vector based on a training dataset is performed via grouping of the items without reference to labels.

8. A system for item recommendation at an electronic recommendation system, the system comprising:
a memory that stores a base neural network based recommender model and a plurality of processor executable instructions;
a communication interface that receives a query; and
one or more hardware processors that read and execute the plurality of processor-executable instructions from the memory to perform operations comprising:
receiving, via a data interface, a query;
generating, via the base neural network based recommender model, a first recommendation of at least a first item based on the query, wherein the first item is associated with a vector of tags;
computing a scalar value indicative of a relevance level between the first item and a specific domain based on a multiplication of the vector of tags with a learnable coefficient vector associated with the specific domain; and
displaying the first item via a user interface in response to the scalar value surpassing a threshold.

9. The system of claim 8, wherein the one or more hardware processors further read and execute the plurality of processor-executable instructions from the memory to perform operations comprising:
updating values of the learnable coefficient vector based on the first item in response to the scalar value surpassing the threshold.

10. The system of claim 9, wherein the updating includes increasing values of the learnable coefficient vector associated with tags in the vector of tags associated with the first item.

11. The system of claim 8, wherein the first recommendation further includes a second item based on the query associated with a second vector of tags, further comprising:
computing a second scalar value indicative of a relevance level between the second item and the specific domain based on a multiplication of the second vector of tags with the learnable coefficient vector associated with the specific domain; and
rejecting the second item in response to the scalar value failing to surpass the threshold.

12. The system of claim 8, wherein the one or more hardware processors further read and execute the plurality of processor-executable instructions from the memory to perform operations comprising:
updating values of the learnable coefficient vector based on a training dataset including a plurality of items.

13. The system of claim 12, wherein the updating values of the learnable coefficient vector based on a training dataset is performed based on a plurality of labels associated with the plurality of items.

14. The system of claim 12, wherein the updating values of the learnable coefficient vector based on a training dataset is performed via grouping of the items without reference to labels.

15. A non-transitory machine-readable medium comprising a plurality of machine-executable instructions which, when executed by one or more processors, are adapted to cause the one or more processors to perform operations comprising:
receiving, via a data interface, a query;
generating, via a base neural network based recommender model, a first recommendation of at least a first item based on the query, wherein the first item is associated with a vector of tags;
computing a scalar value indicative of a relevance level between the first item and a specific domain based on a multiplication of the vector of tags with a learnable coefficient vector associated with the specific domain; and
displaying the first item via a user interface in response to the scalar value surpassing a threshold.

16. The non-transitory machine-readable medium of claim 15, wherein the one or more processors, are further adapted to cause the one or more processors to perform operations comprising:
updating values of the learnable coefficient vector based on the first item in response to the scalar value surpassing the threshold.

17. The non-transitory machine-readable medium of claim 16, wherein the updating includes increasing values of the learnable coefficient vector associated with tags in the vector of tags associated with the first item.

18. The non-transitory machine-readable medium of claim 15, wherein the first recommendation further includes a second item based on the query associated with a second vector of tags, further comprising:
computing a second scalar value indicative of a relevance level between the second item and the specific domain based on a multiplication of the second vector of tags with the learnable coefficient vector associated with the specific domain; and
rejecting the second item in response to the scalar value failing to surpass the threshold.

19. The non-transitory machine-readable medium of claim 15, wherein the one or more processors, are further adapted to cause the one or more processors to perform operations comprising:

updating values of the learnable coefficient vector based on a training dataset including a plurality of items.

20. The non-transitory machine-readable medium of claim 19, wherein the updating values of the learnable coefficient vector based on a training dataset is performed based on at least one of:
- a plurality of labels associated with the plurality of items; or
- a grouping of the items without reference to labels.

* * * * *